United States Patent
Mahamuni

(10) Patent No.: US 7,715,362 B1
(45) Date of Patent: May 11, 2010

(54) IDENTIFICATION FRAGMENT HANDLING

(75) Inventor: Atul B. Mahamuni, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 341 days.

(21) Appl. No.: 11/944,515

(22) Filed: Nov. 23, 2007

(51) Int. Cl.
*H04L 12/28* (2006.01)

(52) U.S. Cl. .................................... 370/351

(58) Field of Classification Search ............... 370/351, 370/389, 473–475; 709/238, 245, 246
See application file for complete search history.

(56) References Cited

U.S. PATENT DOCUMENTS

| | | | | |
|---|---|---|---|---|
| 6,453,357 B1 * | 9/2002 | Crow et al. | ............... | 709/236 |
| 7,298,745 B2 * | 11/2007 | Egevang | ................. | 370/394 |
| 7,356,335 B2 * | 4/2008 | Akiyama | ................. | 455/424 |
| 2004/0093425 A1 * | 5/2004 | Thomas | ................. | 709/236 |
| 2004/0210669 A1 * | 10/2004 | Lee | ....................... | 709/236 |

\* cited by examiner

*Primary Examiner*—Dmitry H Levitan
(74) *Attorney, Agent, or Firm*—Harrity & Harrity, LLP

(57) ABSTRACT

A device stores forwarding information associated with fragments of a first data unit, stores information common to the fragments of the first data unit, receives fragments of a second data unit, and forwards the fragments of the second data unit based on the forwarding information of the first data unit and the information common to the first data unit.

20 Claims, 6 Drawing Sheets

US 7,715,362 B1

IDENTIFICATION FRAGMENT HANDLING

BACKGROUND

Numerous network data unit handling schemes have been developed to improve the performance of capturing and forwarding data. For example, a forwarding device, such as a router or a switch, may be designed to minimize latency, jitter, and/or storage requirements. However, if a data unit is fragmented (e.g., due to a maximum transmission unit requirement) and transmitted through a network, a first fragment may contain forwarding information that may not be contained in other fragments of the same data unit. As a result, a forwarding device may wait before forwarding fragments of a first data unit until a first fragment of the first data unit is received. In this regard, a forwarding device may perform sub-optimally.

SUMMARY

According to one aspect, a method may include storing forwarding information of a first data unit and information common to each fragment of the first data unit, receiving a fragment of a second data unit that is not a first fragment of the second data unit, comparing information common to each fragment of the second data unit to the common information of the first data unit, and forwarding the fragment of the second data unit based on the forwarding information of the first data unit if the common information of the second data unit matches the common information of the first data unit.

According to another aspect, a device may include a memory containing instructions and a processor that executes the instructions. The processor may execute the instructions to store forwarding information of a first fragment of a first data unit, receive a fragment of a second data unit that does not include information sufficient to forward the fragment, compare information of the fragment of the second data unit to information included in the first fragment of the first data unit, and forward the fragment of the second data unit based on the forwarding information of the first fragment, if the information of the fragment of the second data unit matches the information included in the first fragment of the first data unit.

According to still another aspect, a computer-readable medium may have stored thereon instructions, executable by at least one processor. The computer-readable medium may include one or more instructions for receiving a plurality of fragments of a first data unit, one or more instructions for storing forwarding information associated with the first data unit, and one or more instructions for forwarding a fragment of a second data unit based on the forwarding information associated with the first data unit.

According to yet another aspect, a device may include means for storing forwarding information associated with fragments of a first data unit, means for storing information common to each fragment of the first data unit, means for receiving fragments of a second data unit, means for comparing the stored common information of the first data unit and that of the second data unit, and means for forwarding the fragments of the second data unit based on the forwarding information associated with the fragments of the first data unit and the information common to each fragment of the first data unit.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings.

DETAILED DESCRIPTION

The following detailed description refers to the accompanying drawings. The same reference numbers in different drawings may identify the same or similar elements. The term "data unit," as used herein, is intended to be broadly interpreted to include a datagram, a packet, a frame, a cell, or any other type of delivery container, unit, and/or mechanism. The term "fragment," as used herein, is intended to be broadly interpreted to include a portion of a data unit that is less than the entire data unit.

Figure 1:
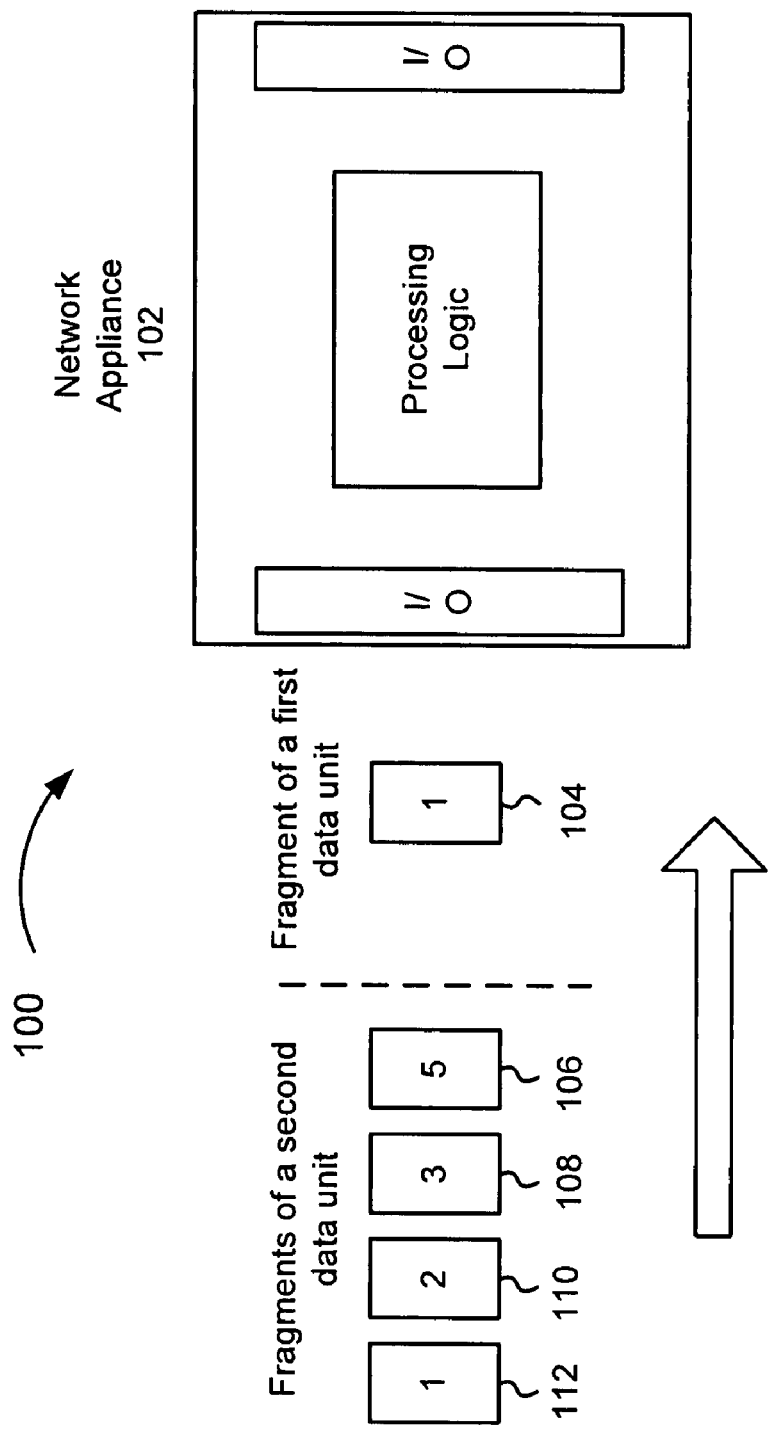
FIG. 1 is a diagram illustrating a system in which concepts described herein may be implemented.

FIG. 1 is a diagram illustrating a system 100 in which concepts described herein may be implemented. As illustrated, system 100 may include a network appliance 102, such as a router. The network appliance may include, among other things, input/output (I/O) interfaces and/or processing logic.

Network appliance 102 may receive fragments of data units. The fragments may arrive out of order. For example, assume that a first fragment 104 of a first data unit arrives at network appliance 102. First fragment 104 may include forwarding information. Network appliance 102 may store the forwarding information of the first data unit in, for example, a cache (not illustrated). Additionally, network appliance 102 may store common information that may be included in each fragment of the first data unit. The common information and the forwarding information may operate as a map forwarding mechanism for subsequent incoming fragments received by network appliance 102.

As illustrated in FIG. 1, if a fifth fragment 106 of a second data unit arrives, network appliance 102 may determine common information associated with fifth fragment 106 that is contained in each fragment of the second data unit. For example, the common information may include a source address, a destination address, and a type of service (TOS). Network appliance 102 may compare (e.g., via the processing logic) the common information of the second data unit to the common information of the first data unit. If a match exists, fifth fragment 106 of the second data unit may forwarded based on the forwarding information of the first data unit. Further, other fragments of the second data unit (e.g., a third fragment 108, a second fragment 110, etc.) may be forwarded based on the forwarding information of the first data unit. In this way, fragments of the second data unit may be forwarded before first fragment 112 of the second data unit, which contains the forwarding information, is received.

However, since it is possible that fifth fragment 106 of the second data unit and the other fragments of the second data unit may not belong to a same flow as the first data unit (i.e., the forwarding information of the first and the second data units may not be the same), fifth fragment 106 and the other fragments of the second data unit may be, for example, buffered until first fragment 112 of the second data unit arrives. If the forwarding information of the second data unit does not match the forwarding information of the first data unit, the buffered fragments of the second data unit may be forwarded based on the forwarding information of the first fragment of the second data unit.

As a result of the foregoing, a network appliance may forward fragments of a data unit before an arrival of a first fragment of the data unit. The concepts described herein have been partially described in connection to FIG. 1. Accordingly, variations to the above will be described below.

Exemplary Environment

Figure 2:
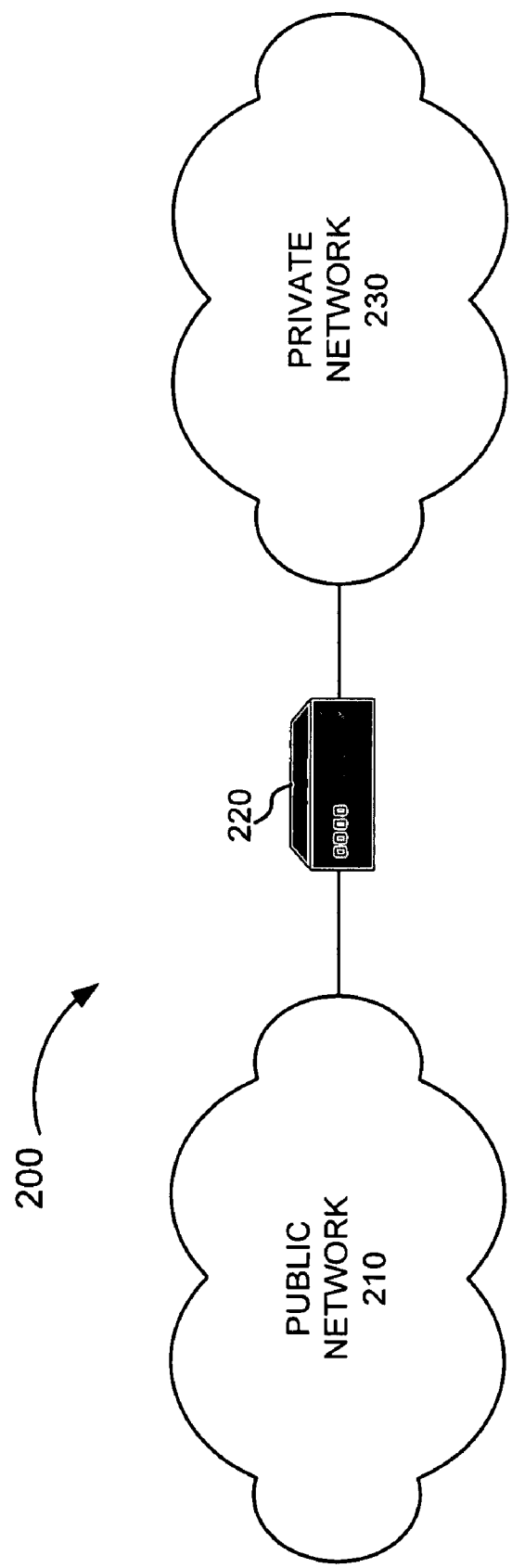
FIG. 2 is a diagram illustrating an exemplary environment in which concepts described herein may be implemented.

FIG. 2 is a diagram illustrating an exemplary environment 200 in which concepts described herein may be implemented. As illustrated, environment 200 may include a public network 210, an appliance 220, and/or a private network 230. The connections of environment 200 may be, for example, wired and/or wireless, and the connections may be direct and/or indirect.

Public network 210 may include, for example, the Internet, an Intranet, a local area network (LAN), a wide area network (WAN), a wireless network, a telephone network (e.g., a Public Switched Telephone Network (PSTN)), any other type of network, or a combination of networks. Public network 210 may include client computing stations (not illustrated), such as computing devices of end-users.

Appliance 220 may include a data unit capture and forwarding device. For example, appliance 220 may include a router, a switch, a repeater, a hub, a gateway, a bridge, a network interface card (NIC), a server, and/or a network security device, such as a firewall or intrusion detection system.

Private network 230 may include, for example, an Intranet, a local area network (LAN), any other type of network, or a combination of networks. Private network 230 may include client computing stations (not illustrated), such as computing devices of end-users.

Although FIG. 2 illustrates an exemplary environment, in other implementations, environment 200 may include fewer, additional, or different devices. Additionally, or alternatively, environment 200 may not include public network 210 and/or private network 230.

Exemplary Device

Figure 3:
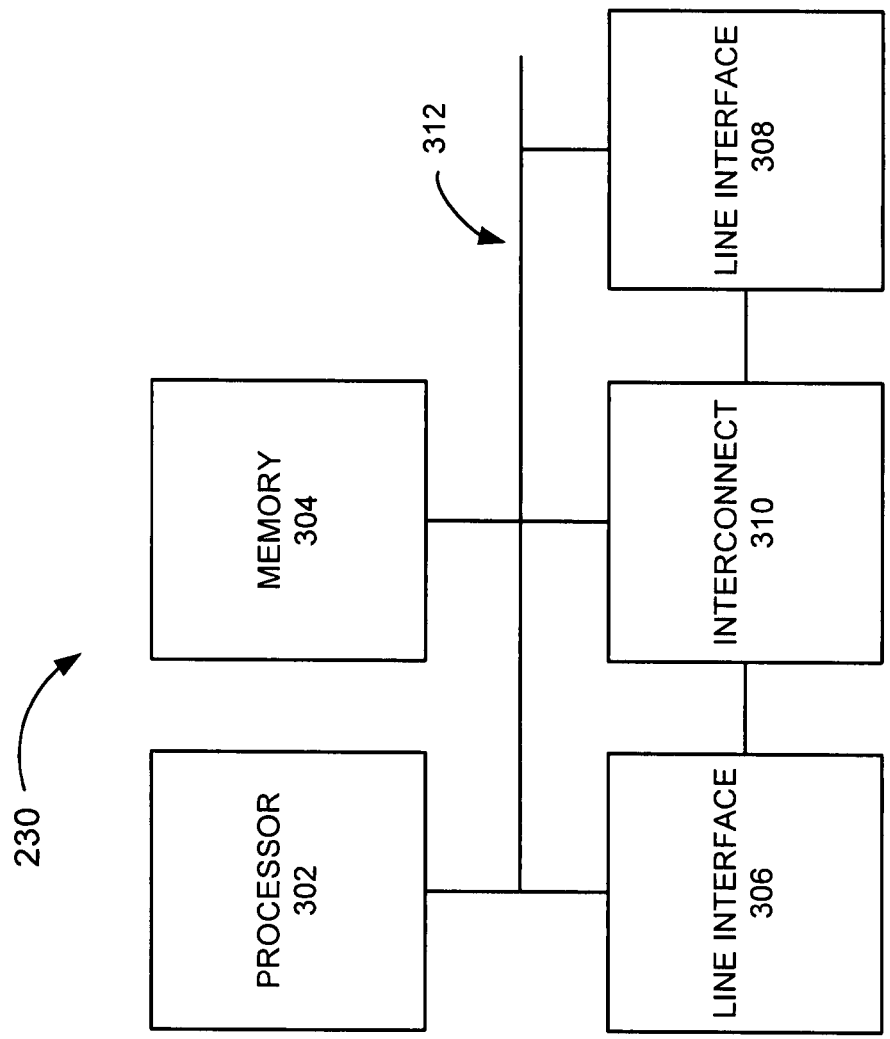
FIG. 3 is a diagram illustrating exemplary components of a device that may correspond to an appliance depicted in FIG. 2.

FIG. 3 is a diagram illustrating exemplary components of a device that may correspond to appliance 220. The term "component," as used herein, is intended to be broadly interpreted to include hardware, software, and/or a combination of hardware and software. As illustrated, appliance 220 may include a processor 302, a memory 304, a line interface 306, a line interface 308, an interconnect 310, and/or a bus 312.

Processor 302 may include one or more processors, microprocessors, controllers, general purpose processors, application specific integrated circuits (ASICs), field programmable gate arrays (FPGAs), discrete gates or transistor logic, discrete hardware components, and/or processing components that may interpret and/or execute instructions.

Memory 304 may include static memory, such as read only memory (ROM), dynamic memory, such as random access memory (RAM), registers, and/or onboard cache, for storing data and machine-readable instructions. Additionally, or alternatively, memory 304 may include a storage device, such as a hard drive, a floppy disk, a compact disc (CD) ROM, a CD read/write (R/W) disc, and corresponding drives, and/or a flash memory, as well as other types of storage devices. Alternatively, other memory devices may be external to memory 304.

Line interfaces 306 and 308 may include a device for receiving incoming packets from a network and for forwarding outgoing packets to a network, such as public network 210, and/or private network 230. For example, line interface 306 and/or line interface 308 may include a network interface card (NIC), a communication port, an Institute of Electrical and Electronics Engineers (IEEE) 1394 interface, an infrared interface, a Personal Computer Memory Card International Association (PCMCIA) card, etc. Line interfaces 306 and 308 may include an application-specific integrated circuit (ASIC) and/or other types of components.

Line interfaces 306 and 308 may implement industry promulgated protocol standards, such as transmission control protocol/Internet protocol (TCP/IP), asynchronous transfer mode (ATM), digital subscriber line (DSL), integrated services network (ISDN), fiber channel, synchronous optical network (SONET), Ethernet IEEE 802 standards, etc. Additionally, or alternatively, line interfaces 306 and 308 may implement non-standard, proprietary, and/or customized interface protocols. Line interfaces 306 and 308 may each contain a plurality of line interfaces to handle multiple traffic flows.

Interconnect 310 may include a switch or connection for conveying an incoming data packet or data unit from line interface 306 to line interface 308 based on a data unit destination and/or stored path information. For example, interconnect 310 may include a communication bus or a switching fabric.

Bus 312 may include a path that permits communication among the components of appliance 220. For example, bus 312 may include a system bus, an address bus, a data bus, etc.

Appliance 220 may perform certain operations, as described in detail below. Appliance 220 may perform these operations in response to processor 302 executing software instructions contained in a computer-readable medium, such as memory 304. A computer-readable medium may be defined as a physical or logical memory device. The software instructions may be read into memory 304 from another computer-readable medium, such as from another device via line interfaces 306 and/or 308. The software instructions contained in memory 304 may cause processor 302 to perform processes that will be described later. Alternatively, hardwired circuitry may be used in place of or in combination with software instructions to implement processes as described herein. Thus, implementations described herein are not limited to any specific combination of hardware circuitry and software.

Although FIG. 3 illustrates exemplary components of appliance 220, in other implementations, fewer, additional, or different components may be utilized. For example, appliance 220 may include a display or another type of input/output device. Additionally, or alternatively, functionalities of some components of appliance 220 may be incorporated into other components of appliance 220. For example, part of processor 302 and/or part of memory 304 may be included in line interfaces 306, 308. Additionally, or alternatively, part of memory 304 may be included in processor 302. Further, in other implementations, the configuration of the components of appliance 220, as depicted in FIG. 3, may be different.

Figure 4:
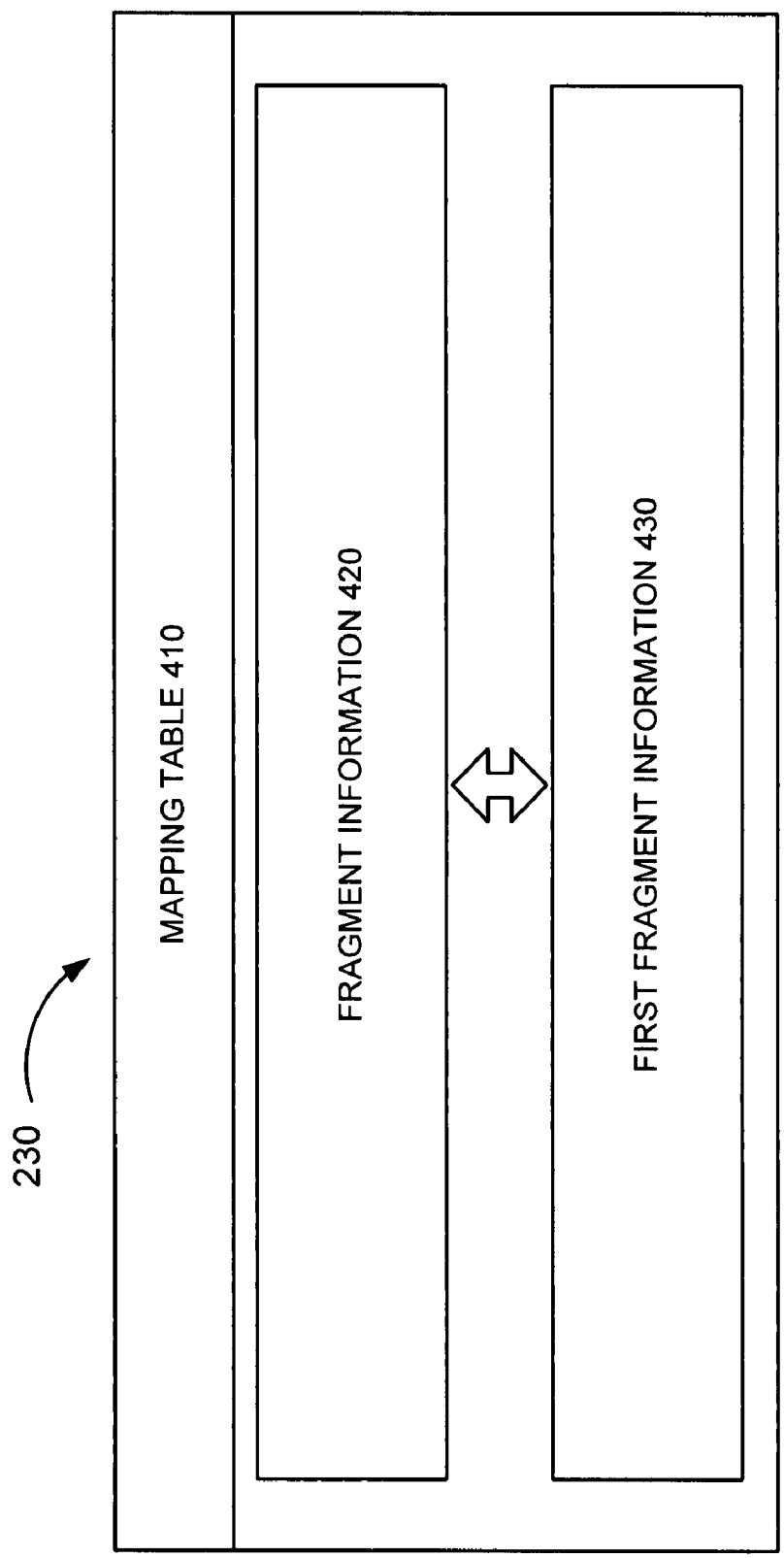
FIG. 4 is a diagram illustrating an exemplary data unit forwarding mechanism that may be employed by a network appliance depicted in FIG. 2.

FIG. 4 is a diagram illustrating an exemplary data unit forwarding mechanism that may be employed by appliance 220. As illustrated, appliance 220 may include a mapping table 410 that may include fragment information (FI) 420, and first fragment information (FFI) 430. Given the variety of information contained in a data unit (e.g., header information, trailer information, etc.), for purposes of discussion, assume that mapping table 410 pertains to fragmented IP data units.

Mapping table 410 may include information for forwarding fragmented IP data units. In one implementation, mapping table 410 may reside in memory 304 of appliance 220.

FI 420 may include information that may be common to any fragment of an IP data unit. For example, when considering a fragment of an IP data unit, a fragmented IP data unit may include, among other things, a source address, a destination address, and TOS information. In one implementation, this three-tuple information may be considered as common information to any fragment of an IP data unit. The three-tuple information may be hashed and stored as FI 420.

FFI 430 may include information that may be included with a first fragment of an IP data unit, such as forwarding information. For example, when considering a first fragment of an IP data unit, the first fragment may include, among other things, a source address, a destination address, and protocol information in an IP header, and a source port, and a destination port, in a transmission control protocol (TCP) header or in a user datagram protocol (UDP) header. In one implementation, this quintuplet information may be considered forwarding information. The quintuplet information may be hashed and stored as FFI 430.

Although FIG. 4 illustrates an exemplary forwarding data unit mechanism, in other implementations, fewer, additional, or different mechanisms and/or information may be utilized. For example, although information common to a fragment of an IP data unit has been described to include a source address, a destination address, and TOS information, other types of information common to a fragment of an IP data unit may be employed. Even more generally, when considered information common to a fragment of a data unit, fewer, different, or additional information may be employed.

Exemplary Processes

Figure 5:
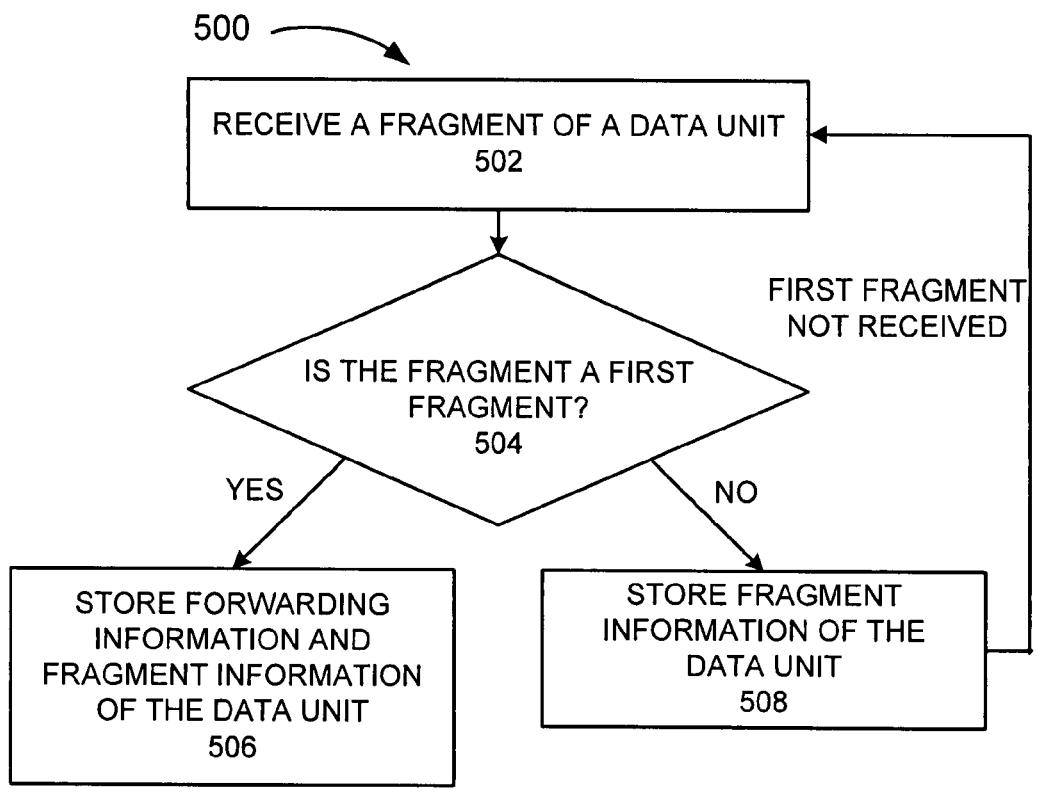
FIGS. 5 and 6 are flow charts illustrating exemplary processes for performing operations that may be associated with the concepts described herein.

FIG. 5 is a flow chart illustrating an exemplary process 500 for performing operations that may be associated with the concepts described herein. For purposes of discussion, prior to process 500 beginning, it may be assumed that appliance 220 is in an initial state where no fragmented data units have been received. Further, it may be assumed that only one data unit is fragmented and received by appliance 220. Process 500 may be employed to obtain the information included in mapping table 410.

Process 500 may begin with receipt of a fragment of a data unit (block 502). For example, appliance 220 may receive a fragment of an IP datagram. A determination may be made whether the fragment is a first fragment (block 504). For example, processor 302 may determine whether the fragment is a first fragment based on IP header. This header information may be utilized to determine FFI 430.

If it is determined that the fragment is a first fragment (block 504—YES), FFI 430 may be stored in memory 304, such as in mapping table 410. Additionally, for example, processor 302 may determine FI 420 based on, for example, IP header information of the first fragment. FI 420 may be stored in memory 304, such as in mapping table 420.

If it is determined that the fragment is not a first fragment (block 504—NO), FI 420 may be stored in memory 304, such as in mapping table 410. Process 500 may repeat until a first fragment of the data unit is received.

Although FIG. 5 illustrates an exemplary process, in other implementations, fewer, additional, or different operations may be performed.

Figure 6:
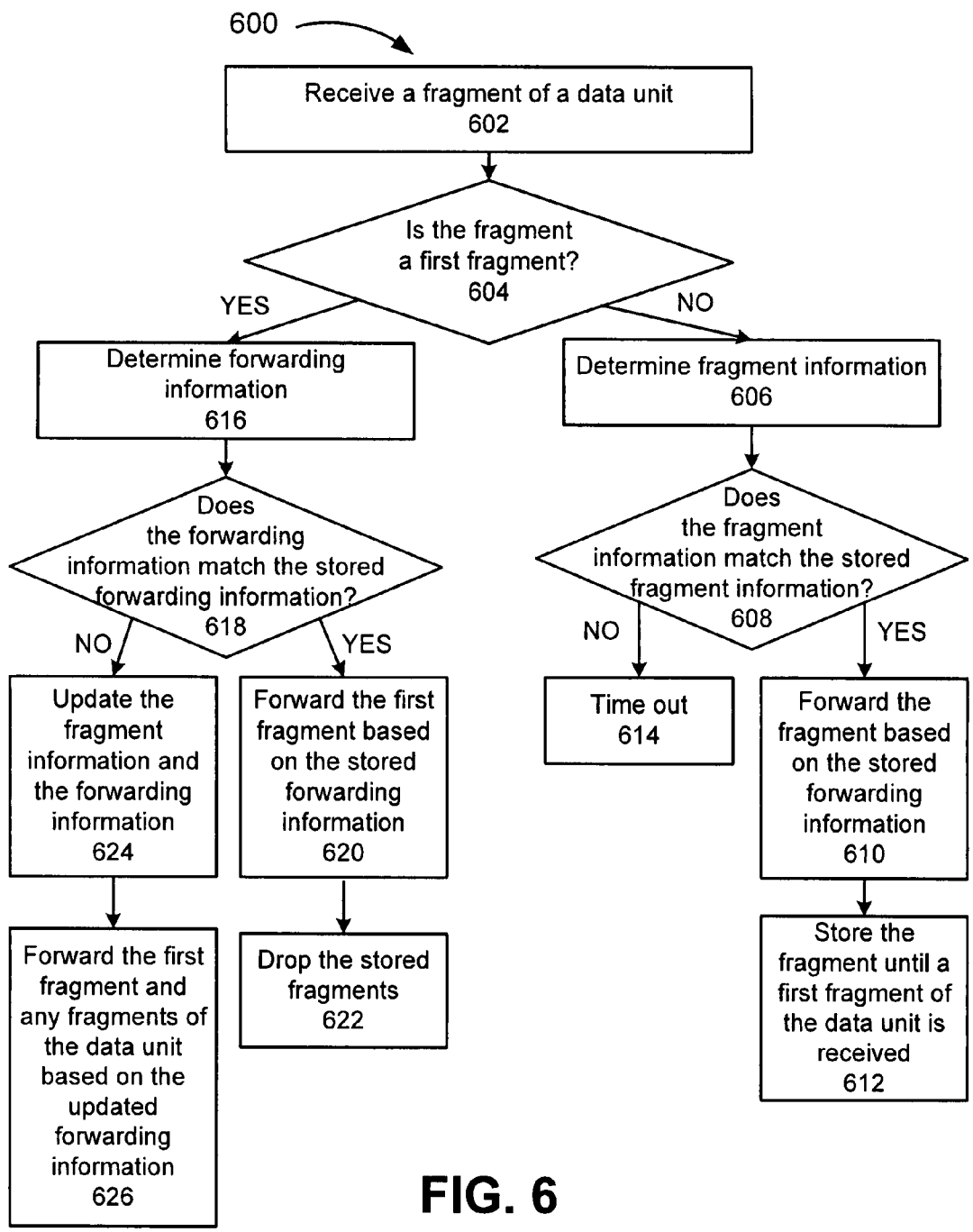

FIG. 6 is a flow chart illustrating an exemplary process 600 for performing operations that may be associated with the concepts described herein. For purposes of discussion, it may be assumed that process 600 begins after process 500 is completed. Further, it may be assumed that a second IP datagram is fragmented and received by appliance 220.

Process 600 may begin with receipt of a fragment of a data unit (block 602). For example, appliance 220 may receive a fragment of an IP datagram. Processor 302 may determine whether the fragment is a first fragment based on header information. In one implementation, the header information may include FFI 430.

If it is determined that the fragment is not a first fragment (block 604—NO), fragment information may be determined (block 606). For example, FI 420 may be determined. In one implementation, this determination may be made simultaneously in block 604.

A determination may be made whether the fragment information matches the stored fragment information (block 608). For example, FI 420 of the fragment of the second data unit may be hashed and compared to the stored FI 420 in mapping table 410. If the fragment information matches the stored fragment information (block 608—YES), the fragment may be forwarded based on the stored forwarding information (block 610). For example, if FI 420 of the second data unit matches FI 420 of mapping table 410, the fragment of the second data unit may be forwarded based on FFI 430 of mapping table 410. The fragment may be stored until a first fragment of the data unit is received (block 612). For example, the fragment of the second data unit may be stored in memory 304.

If the fragment information does not match the stored fragment information (block 608—NO), a timeout may be implemented (block 614). For example, a mismatch between FI 420 and the stored FI 420 may indicate the existence of multiple IP flows. In one implementation, in addition to determining if a multiple flows exist, the TCP header or the UDP header may be inspected. If it is determined that a multiple flows exist, the timeout period may last a specified period. During this specified period, fragments of a data unit that are received may be forwarded if a first fragment of the data unit (i.e., which may contain the forwarding information) is received. As described below, other situations may cause a timeout.

Returning to block 604, if it is determined that the fragment is a first fragment (block 604—YES), forwarding information may be determined (block 616). For example, FFI 430 may be determined based on header information of the fragment. In one implementation, FFI 430 may be determined simultaneously in block 604.

A determination may be made if the forwarding information matches the stored forwarding information (block 618). For example, FFI 430 of the fragment of the second data unit may be hashed and compared to the stored FFI 430. If the FFI 430 matches the stored FFI 430 (block 618—YES), the fragment may be forwarded based on the stored forwarding information (block 620). For example, the first fragment of the second data unit may be forwarded based on the stored FFI 430 in mapping table 410.

After the first fragment matching the stored forwarding information (block 618) is forwarded based on the stored forwarding information (block 620), then the stored fragments may be dropped (block 622). For example, any fragments of the second data unit that may be stored as a result of block 612 may be cleared from memory 304.

Returning to block 618, if the forwarding information does not match the stored forwarding information (block 618—

NO), the fragment information and the forwarding information may be updated (block 624). For example, mapping table 410 may be updated. That is, the stored FI 420 and the stored FFI 430 of the first data unit may be replaced with FI 420 and FFI 430 of the first fragment of the second data unit.

The first fragment and any fragments of the data unit may be forwarded based on the updated forwarding information (block 626). For example, the first fragment of the second data unit and any fragments of the second data unit that may have been stored are result of block 612 may be forwarded based on the updated FFI 430 of the second data unit.

Although FIG. 6 illustrates exemplary process 600, in other implementations, fewer, additional, or different operations may be employed. For example, process 600 may time out if thrashing occurs. That is, for example, if there is an occurrence of multiple changes to FFI 430 during a short duration, a time out may be employed. The length of a back-off period (i.e., the time out period) may be, for example, a fixed time and/or a time period determined as a function of a thrashing value. In such an instance, IP fragments of a data unit may be forwarded once the first fragment is received and forwarding information is determined for that data unit.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, depending on how a data unit may be fragmented (i.e., the fragmentation and/or reassembly algorithm employed), variations to the concepts described herein may be envisioned.

In addition, while a series of blocks has been described with regard to the processes illustrated in FIGS. 5 and 6, the order of the blocks may be modified in other implementations. Further, non-dependent blocks may be performed in parallel. Further, it may be possible to omit blocks within the processes of FIGS. 5 and 6. For example, in process 500, block 508 may be omitted if the fragment received first by appliance 220 is the first fragment.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing forwarding information of a first data unit and information common to each fragment of the first data unit;
    receiving a fragment of a second data unit that is not a first fragment of the second data unit;
    comparing information common to each fragment of the second data unit to the common information of the first data unit; and
    forwarding the fragment of the second data unit based on the forwarding information of the first data unit if the common information of the second data unit matches the common information of the first data unit.

2. The method of claim 1, where the forwarding comprises:
    forwarding the fragment of the second data unit before the first fragment of the second data unit is received.

3. The method of claim 1, further comprising:
    receiving the first fragment of the second data unit.

4. The method of claim 3, further comprising:
    determining forwarding information of the second data unit based on the first fragment of the second data unit; and
    comparing the forwarding information of the second data unit with the forwarding information of the first data unit.

5. The method of claim 4, further comprising:
    storing the fragment of the second data unit.

6. The method of claim 5, further comprising:
    forwarding the first fragment of the second data unit based on the forwarding information of the first data unit if the forwarding information of the second data unit matches the forwarding information of the first data unit; and
    dropping the stored fragment of the second data unit.

7. The method of claim 4, further comprising:
    replacing the forwarding information and the common information stored from the first data unit with the forwarding information and the common information of the second data unit based on the first fragment of the second data unit, and
    forwarding the first fragment of the second data unit and the stored fragment of the second data unit based on the forwarding information of the second data unit.

8. The method of claim 1, further comprising:
    determining whether multiple flows exist if the common information of the second data unit does not match the common information of the first data unit;
    waiting to forward the fragment of the second data unit until the first fragment of the second data unit is received if it is determined that multiple flows exits.

9. A device comprising:
    a memory containing instructions; and
    a processor that executes the instructions to:
        store forwarding information of a first fragment of a first data unit,
        receive a fragment of a second data unit that does not include information sufficient to forward the fragment,
        compare information of the fragment of the second data unit to information included in the first fragment of the first data unit, and
        forward the fragment of the second data unit based on the forwarding information of the first fragment, if the information of the fragment of the second data unit matches the information included in the first fragment of the first data unit.

10. The device of claim 9, where the information of the fragment of the second data unit includes a source address, a destination address, and a type of service.

11. The device of claim 9, where the forwarding information of the first fragment includes a source address, a destination address, protocol information, a source port, and a destination port.

12. The device of claim 9, where the processor further executes instructions to:
    store a copy of the fragment of the second data unit until a first fragment of the second data unit is received.

13. The device of claim 9, where the processor further executes instructions to:
    receive a first fragment of the second data unit, the first fragment of the second data unit including forwarding information; and
    compare the forwarding information of the first fragment of the second data unit to the forwarding information of the first fragment of the first data unit.

14. The device of claim 13, where the processor further executes instructions to:
    forward the first fragment of the second data unit based on the forwarding information of the first fragment of the first data unit, if the forwarding information of the first fragment of the second data unit matches the forwarding information of the first fragment of the first data unit, or
    update the forwarding information stored from the first fragment of the first data unit with the forwarding information of the first fragment of the second data unit.

15. A computer-readable medium having stored thereon instructions, executable by at least one processor, the computer-readable medium comprising:
    one or more instructions for receiving a plurality of fragments of a first data unit;
    one or more instructions for storing forwarding information associated with the first data unit; and
    one or more instructions for forwarding a fragment of a second data unit based on the forwarding information associated with the first data unit.

16. The computer-readable medium of claim 15, where the fragment of the second
    data unit is a first fragment of the second data unit.

17. The computer-readable medium of claim 15, further comprising:
    one or more instructions for storing information common to the plurality of fragments of the first data unit.

18. The computer-readable medium of claim 17, further comprising:
    one or more instructions for comparing information of the fragment of the second data unit with the information common to the plurality of fragments of the first data unit.

19. The computer-readable medium of claim 15, where the fragment of the second
    data unit is not a first fragment of the second data unit.

20. A device comprising:
    means for storing forwarding information associated with fragments of a first data unit;
    means for storing information common to each fragment of the first data unit;
    means for receiving fragments of a second data unit;
    means for comparing the stored common information of the first data unit and that of the second data unit; and
    means for forwarding the fragments of the second data unit based on the forwarding information associated with the fragments of the first data unit and the information common to each fragment of the first data unit.

* * * * *